United States Patent [19]

Doggett et al.

[11] Patent Number: 4,622,555
[45] Date of Patent: Nov. 11, 1986

[54] CODED PULSE DOPPLER RADAR WITH CLUTTER-ADAPTIVE MODULATION AND METHOD THEREFORE

[75] Inventors: John G. Doggett, Scottsdale; John M. Jones; Ray O. Waddoups, both of Mesa, all of Ariz.

[73] Assignee: Motorola, Inc., Schaumburg, Ill.

[21] Appl. No.: 414,158

[22] Filed: Sep. 2, 1982

[51] Int. Cl.$^4$ .................. G01S 13/26; G01S 7/42
[52] U.S. Cl. ........................... 342/84; 342/192; 342/159
[58] Field of Search ............... 343/5 CE, 5 SA, 7 A, 343/7.5, 17.2 R, 17.2 PC, 5 FT, 7.7

[56] References Cited

U.S. PATENT DOCUMENTS

| 3,114,909 | 12/1963 | Varela | 343/17.2 R |
| 3,487,406 | 12/1969 | Howard | 343/17.2 R X |
| 3,487,409 | 12/1969 | Thick et al. | 343/17.2 R |
| 3,614,719 | 10/1971 | Treacy | 343/5 SA |
| 3,702,476 | 11/1972 | Nathanson et al. | 343/17.2 R X |
| 3,882,493 | 5/1975 | Bolger | 343/5 SA X |
| 3,883,871 | 5/1975 | Moore | 343/17.2 R |
| 4,003,053 | 1/1977 | Mengel | 343/17.2 R X |
| 4,078,234 | 3/1978 | Fishbein et al. | 343/17.2 R X |
| 4,119,966 | 10/1978 | Bouvier et al. | 343/7.7 |
| 4,231,037 | 10/1980 | Long | 343/7 A X |
| 4,249,179 | 2/1981 | Kolacny | 343/7 A |
| 4,290,066 | 9/1981 | Butler | 343/7.5 X |
| 4,339,754 | 7/1982 | Hammers et al. | 343/7 A X |
| 4,450,446 | 5/1984 | Clancy et al. | 343/7.7 |

Primary Examiner—T. H. Tubbesing
Assistant Examiner—Gilberto Barrón, Jr.
Attorney, Agent, or Firm—Eugene A. Parsons

[57] ABSTRACT

A coded pulse Doppler radar having apparatus for determining the separation between the frequency spectrum returned from clutter and the frequency spectrum returned from a desired target, and circuitry responsive to the apparatus for adjusting the code to maintain the separation at least at a predetermined minimum value.

6 Claims, 5 Drawing Figures

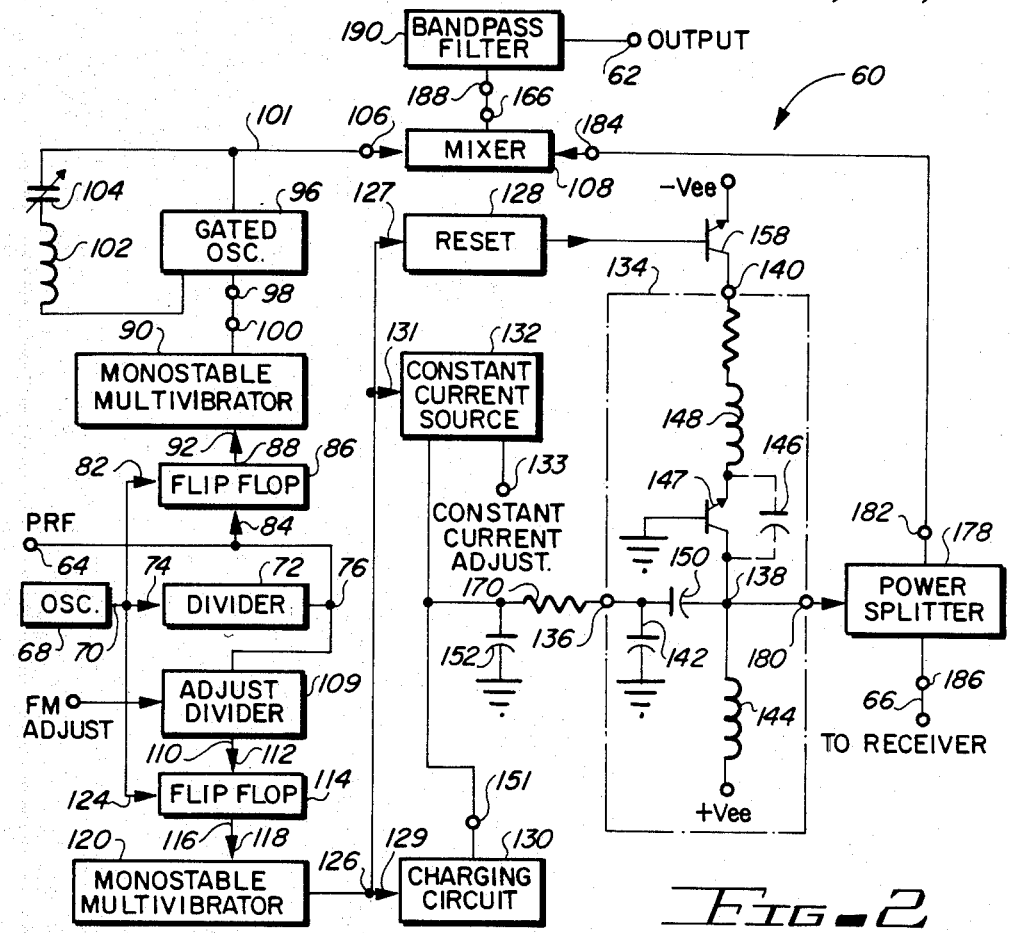
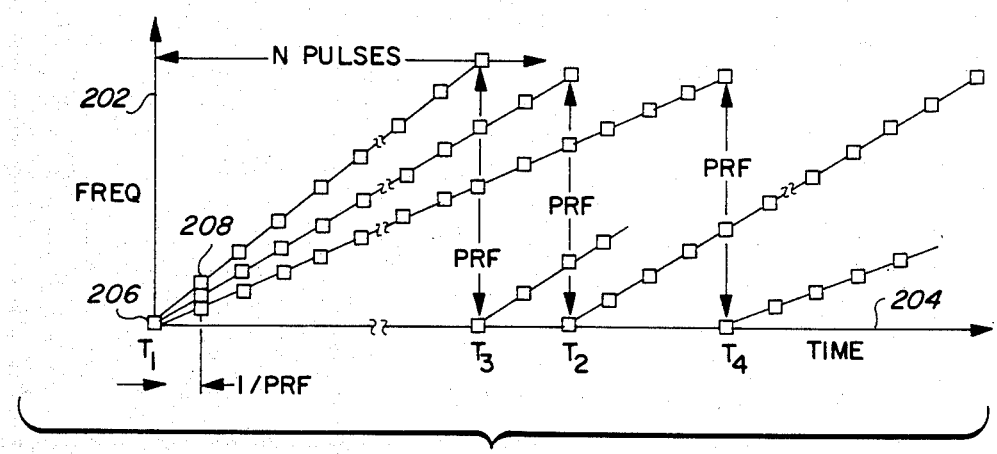
FIG-2
FIG-4

CODED PULSE DOPPLER RADAR WITH CLUTTER-ADAPTIVE MODULATION AND METHOD THEREFORE

BACKGROUND OF THE INVENTION

In general pulsed Doppler radars transmit pulses of coherent radio frequency into a region under observation. These pulses are reflected by the objects in the region and each object changes the frequency of the reflected pulse in dependence on the velocity of the object relative to the radar, as governed by the Doppler principal. Generally, objects which are moving relative to the ground in the region of observation are targets, and signals reflected from the ground, i.e., trees waving in the wind, waves in water, clouds, etc. are commonly referred as clutter.

Radars of aircraft or missiles flying at relatively low altitudes encounter severe reflection of the radar signals off of the ground environment and off of such weather conditions as clouds, fog, and drizzle. These clutter signals further complicate the synthesis of velocity and ranging information because of radar response ambiguity peaks. Conventional prior art pulse modulation and prior frequency modulation radars have ambiguity response characteristics comprised of a multiplicity of unwanted ambiguity response peaks on their frequency and time axes which makes them sensitive to clutter and high level corrupting signals. U.S. Pat. No. 3,883,871, entitled "Method and Modulation System for Ambiguity Reduction in Pulse Radar", issued May 13, 1975, discloses a modulation system for pulsed radar wherein the modulated signal rotates the time-frequency plane of the pulse modulation ambiguity response pattern of the radar with respect to the amplitude axis so that unwanted ambiguities are shifted off of the time and frequency axis to facilitate velocity and range measurement. This method and apparatus greatly reduces the ambiguities in the system but, while the effects of clutter are greatly reduced, clutter is still a problem.

U.S. Pat. No. 4,119,966, entitled "Clutter Discriminating Apparatus for Use with Pulsed Doppler Radar Systems and the Like", issued Oct. 10, 1978, describes apparatus for differentiating desired targets from clutter in the return of a pulsed Doppler radar. For certain target velocities and aspect angles, the apparatus described in both of the above referenced patents and all other phase and frequency coded modulation pulsed radar the target return is allowed to be obliterated by radar clutter. For typical target velocities the number of aspect angles that are obscured by clutter is between 10 and 20. In the prior art, the radar designer has to assign some likelihood to the different types of target encounters with which he is concerned. He then selects his modulation parameters to minimize the number of ambiguities in the most likely target geometries. Having done this he is forced to accept the inability to separate the target from the clutter at the obliterated velocities and aspect angles.

SUMMARY OF THE INVENTION

The present invention pertains to a method and apparatus of clutter-adaptive modulation in conjunction with a coded pulse Doppler radar wherein a plurality of different codes are provided in the radar, the frequency spectrum of energy returned from a desired target is determined, the frequency spectrum of energy returned from clutter is determined, the frequency separation between the two spectrums is measured or in some way noted and the code is altered to maintain the separation above at least a predetermined minimum value. Thus, the target and clutter are always separated so that the target is not obliterated by the clutter.

It is an object of the present invention to provide new and improved clutter-adaptive modulation for coded pulse doppler radars.

It is a further object of the present invention to provide clutter-adaptive modulation for coded pulse Doppler radar wherein the frequency spectrum of targets and clutter are differentiated and the code is altered if neccessary, to maintain a minimum predetermined separation therebetween.

It is a further object of the present invention to provide clutter-adaptive modulation for coded pulse Doppler radars wherein the code may be adjusted through a variety of variables to maintain at least a minimum separation between the frequency spectrum of a desired target and the frequency spectrum of clutter.

These and other objects of this invention will become apparent to those skilled in the art upon consideration of the accompanying specification, claims, and drawings.

BRIEF DESCRIPTION OF THE DRAWINGS

Referring to the drawings,

FIG. 2 is a block and schematic diagram of a variable modulation generator utilized in the system in FIG. 1;

FIG. 4 is a graph illustrating several modulated output signals generated by the modulation code generator of FIG. 2

DESCRIPTION OF THE PREFERRED EMBODIMENT

Figure 1:
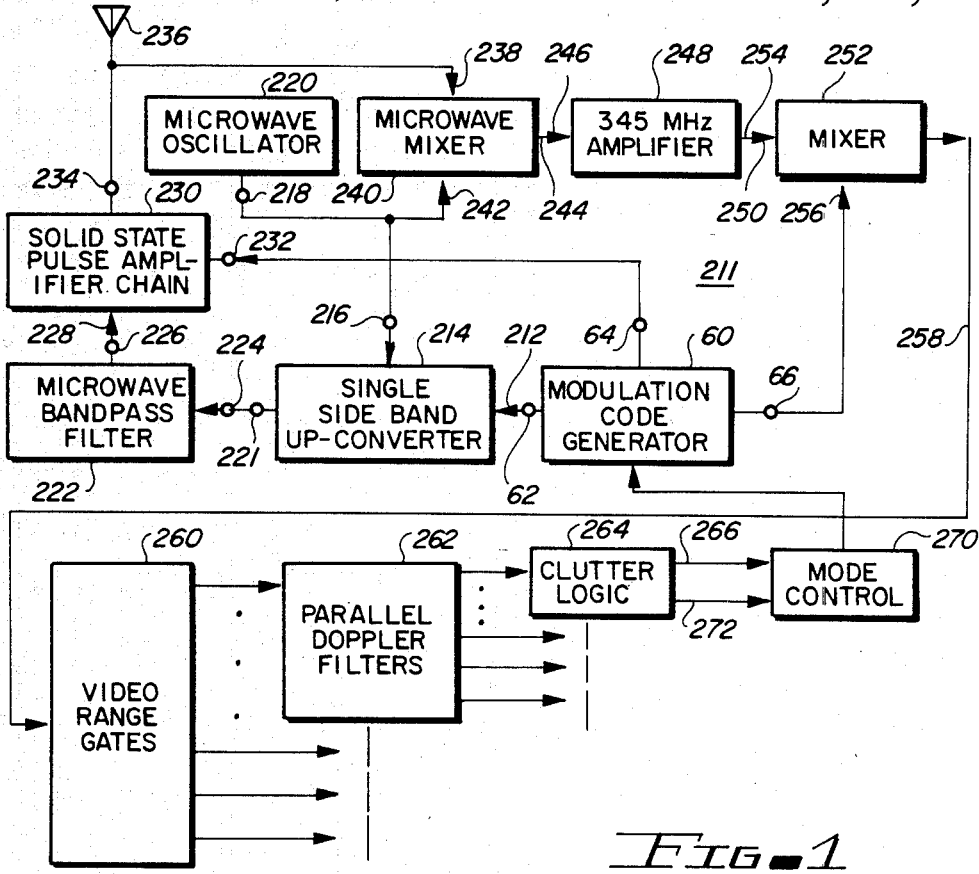
FIG. 1 is a block diagram of a microwave radar system embodying the present invention.

Referring specifically to FIG. 1, a microwave radar system 211 is illustrated. A modulation code generator 60 supplies a modulated output signal to a first input 212 of a single sideband up-converter 214. A second input 216 of the up-converter 214 is connected to an output terminal 218 of a microwave oscillator 220 which provides a carrier signal having a frequency on the order of 10 gigahertz. The sums and differences of the frequency components of the carrier signal and the modulator output signal are created at up-converter output terminal 221. A microwave band pass filter 222, which has an input 224 connected to output 221, selects and applies the upper side band of the modulated, microwave carrier through an output 226 to an input terminal 228 of a gated, pulse amplifier chain 230. A pulse repetition frequency (PRF) output terminal 64 of modulation code generator 60 is connected to a gate terminal 232 of pulse amplifier chain 230 so that the PRF signal can gate the amplifier chain in phase synchronism with the existence of a modulated signal. An output terminal 234 of amplifier chain 230 is connected to an antenna 236 through which the modulated radar signal is transmitted.

Echo signals from the transmitted radar signal return through antenna 236 and are applied to a first input 238 of a microwave mixer circuit 240. A second input 242 of mixer 240 is connected to output terminal 218 of microwave oscillator 220. Mixer 240 down converts the received signal and applies it through output terminal 244 to an input terminal 246 of an intermediate frequency amplifier 248 which has a pass-band centered about 345 megahertz. An input terminal 250 of a mixer 252 is connected to an output terminal 254 of amplifier 248 for receiving the amplified IF signal. A second input 256 of mixer 252 is connected to an output 66 of modulation code generator 60 for receiving linear sawtooth frequency modulated signals. By mixing the linear sawtooth frequency modulated signal and the IF signal, mixer 252 provides a 30 megahertz output signal at terminal 258 thereof. This portion of the microwave radar system is fully disclosed in the above referenced U.S. Pat. No. 3,883,871, and it will of course be understood by those skilled in the art that many other types of transmitter/receiver systems might be utilized and the present microwave radar system is illustrated simply because of its convenience and simplicity.

The modulated IF output signal from the mixer 252 is supplied to a plurality of video range gates 260. The output of each of the video range gates is in turn applied through a plurality of parallel Doppler filters 262 with the outputs from the filters 262 being supplied to clutter circuitry 264. Range gates 260 and Doppler filters 262 may be timeshared or hardwired into the circuit in any of the variety of systems well known to those skilled in the art. In the following explanation a system wherein the range gates 260 and filters 262 are all provided and hardwired into the system is utilized for convenience of explanation. Clutter logic circuitry 264 is utilizied to differentiate or discriminate targets and clutter, which operation will be described in more detail presently. Signals representative of the frequency spectrum of energy returned from a desired target are provided on a lead 266 to mode control circuitry 270. Signals representative of the frequency spectrum of energy returned from clutter are provided on a lead 272 to mode control circuit 270. Mode control circuit 270 determines the separation between the two frequency spectrums and provides a control signal to the modulation code generator 60 to vary the code produced thereby so that separation between the frequency spectrums is maintained greater than a predetermined minimum value.

Referring to FIG. 2 a part block and part schematic diagram illustrating the structure of one embodiment of modulation code generator 60 is illustrated. Generator 60 provides a modulated output signal at output 62, a PRF signal at output 64, and a linear sawtooth FM receiver local oscillator at output 66. The modulated signal at output 62 includes a combination of the pulse modulated and FM signals which have a predetermined relationship to each other. The utilization of the modulator output signals in the particular microwave system 211 has been described above.

The generation of the PRF signal will be explained first. An oscillator 68 is crystal controlled to provide a signal at output 70 thereof which has a high degree of frequency stability. A divider 72 which has an input 74 connected to output 70 of the oscillator 68 divides the output frequency of the oscillator 68 to form the PRF signal at an output 76. In one application where an 800 kHz PRF signal is chosen because it removes frequency ambiguities from the velocity limits of possible targets oscillator 68 may oscillate at a constant frequency of 25.6 MHz and divider 72 may be a divide by 32 circuit which provides the 800 kHz PRF. Oscillator 68 and divider 72 and other circuits of modulator 60, may be formed from emitter coupled logic (ECL) type integrated circuitry. ECL circuits have high frequency responses which provide rise times that are essential to modulator 60. The PRF output terminal 64 is connected to the output 76 of the divider 72.

The generation of the pulse modulated wave will be described next. The outputs of oscillators 68 and divider 72 are connected to two inputs 82 and 84, respectively, of a bistable multivibrator (delay flip-flop) 86 which re-establishes the leading edge of the PRF signal. Flip-flop 86 compares the 800 kHz with the 25.6 MHz oscillator signal to thereby provide, at an output terminal 88, a delayed PRF signal having virtually no leading edge jitter. A monostable multivibrator 90 which has an input 92 connected to the output terminal of flip-flop 86, responds to the leading edges of the delayed PRF signal to provide gating pulses for controlling the turn on and turn off of a high frequency gated oscillator 96. The duration of each gating pulse may be on the order of 0.125 microseconds which is 1/10th of the 1.25 microsecond period of the square wave PRF signal.

A gate terminal 98 of high frequency oscillator 96 is connected to an output terminal 100 of monostable multivibrator 90. Gated oscillator 96 responds to each of the gating pulses to provide a burst of sinusoidal output signal of constant frequency at an output terminal 101 thereof. Oscillator 96 is designed so that each burst starts at the same phase point in a cycle. Gated high frequency oscillator 96 may be comprised of ECL cross coupled gate circuits having a series feedback path including an inductor 102 and a capacitor 104 for controlling the frequency of oscillation at 30 MHz. The oscillator output terminal 101 is connected to a first input terminal 106 of a mixer 108. Thus, the top branch of the circuit of FIG. 2 generates a series of continuous frequency bursts or pulse modulated sinusoidal signals, each burst having on the order of three or four cycles therein. The beginning and termination of each burst has a predetermined time relationship to the rising portion of the delayed PRF signal and the starting phase of each burst is the same. Hence the signal at the output 101 of oscillator 96 is in phase synchronism with PRF signals at the output terminal 64 and at the output of flip-flop 86.

The generation of the linear sawtooth, frequency modulated signals will now be described. Output terminal 76 of divider 72 is connected to an input of an adjustable divider 109 which divides the PRF signal to provide a rectangular wave signal at its output terminal 110. A first input 112 of a bistable multivibrator (delay flip-flop) 114 is connected to output 110 and a second input 124 of flip-flop 114 is connected to output 70 of oscillator 68. Flip-flop 114 forms a delayed rectangular signal at an output 116 thereof which is phase coherent and delayed with respect to the output of divider 109 and the output signal of crystal oscillator 68. Flip-flop 114 removes any leading edge jitter created on the waveform by dividers 72 and 109. Hence, the wave form has a precisely determined leading edge that is phase coherent with respect to the PRF signal.

An input terminal 118 of a monostable multivibrator 120 is connected to output 116 of delayed flip-flop 114. The multivibrator 120 responds to the rising edges of the rectangular waveforms to provide reset signals which are phase coherent with the rectangular wave form and have a time duration on the order of 0.2 microseconds. An output terminal 126 of multivibrator 120 is connected to a control terminal 127 of a reset circuit 128, a control terminal 129 of a capacitor charging circuit 130 and to a control terminal 131 of a constant current source 132.

A gated, ultra-high frequency oscillator 134 responds to a voltage of changing magnitude at a control terminal 136 to provide a corresponding linear change in the frequency of sinusoidal output signals at a terminal 138. Moreover, oscillator 134 responds to the existance and nonexistence of reset signal of a negative polarity applied to a reset terminal 140 to respectively initiate and terminate the output signal at output terminal 138 in a precise timed relationship to the reset signal. The frequency determining feedback path of oscillator 134 includes a voltage variable capacitor 142, an inductor 144 and the collector-emitter capacitance 146 which is inherent in a transistor 147. The inductance values of a radio frequency coil 148 and the capacitance of a coupling capacitor 150 are chosen to have negligible effect upon the frequency of oscillation.

More specifically, the existence of a reset pulse occurring at the output of multivibrator 120 renders constant current source 132 and oscillator 134 inoperative and charging circuit 130 operative. Thus, during the 0.2 microsecond duration of the reset pulse, charging circuit 130 provides current at output 151 thereof which is connected to an intergrating capacitor 152. This current rapidly charges capacitor 152. Oscillator reset circuit 128 level shifts, inverts, and shapes each reset pulse to provide a signal which turns off a transistor 158 to remove the supply voltage from a control terminal 140 and renders oscillator 134 inoperative during the time of the reset pulse. Thus, capacitor 152 is charged while oscillator 134 is inoperative.

In response to the change of the reset pulse from its high level to its low level the constant current source 132 begins to discharge integrating capacitor 152 in a linear fashion to form a linear sawtooth or ramp signal. Also, charging circuit 130 is render inoperative and oscillator 134 begins oscillating in synchronism with the foregoing downward transition of the reset pulse at 140. As the voltage across integrating capacitor 152 is discharged, the voltage applied to varactor diode 142 which is connected through a resistor 170 and control terminal 136 to capacitor 152 also decreases. The resulting change in capacitance of the varactor diode 142 causes the frequency of oscillator 134 to be swept from 315.4 MHz which corresponds to the highest magnitude of the sawtooth, to 314.6 MHz which corresponds to the lowest magnitude of the sawtooth signal. The total deviation is adjusted to be equal to the PRF which is 800 kHz. The slope of the ramp signal is also adjusted using control line 133 as divider 109 is adjusted such that the total deviation is maintained equal to the PRF. Furthermore, the amplitude of the ramp signal could be adjusted to cause the deviation to be some perfect multiple of the PRF other than 1. Since the frequency of the oscillator 134 is periodically swept in response to the recurring linear sawtooth the generator waveform is designated as being a linear sawtooth FM signal. The modulation rate of the signal is determined by the repetition rate of the saw tooth which is a submultiple of the PRF, which submultiple is determined by the adjustable divider 109. In the present embodiment the modulation rate of the output signal from the oscillator 134 is determined by the setting of the adjustable divider 109, however, it will be understood by those skilled in the art that many other variables might be utilized to alter the modulation rate, such as providing a voltage controlled oscillator for the oscillator 68 so that frequency thereof is variable, providing an adjustable divider in place of the divider 72 so that the PRF and the modulation rate are both changed combinations of the above, etc.

A power splitter circuit 178 has an input terminal 180 connected to output 138 of oscillator 134, a first output 182 connected to an input 184 of mixer 108 and a second output 186 connected to output 66 of the modulation code generator 60. Power splitter 178 divides the linear sawtooth, FM signal between each of the outputs 182 and 186. Mixer 108 mixes the 10 percent, pulse modulator sinusoidal signal of oscillator 96 with the linear sawtooth FM signal of oscillator 134 at an output terminal 166 which is connected to an input terminal 188 of a bandpass filter 190. The sums of the frequency components of the signals at output 166 of mixer 108, which are centered at a frequency of approximately 345 MHz, are selected and applied to output terminal 62 of code generator 60 by band pass filter 190. The combination of the pulse modulated signal and the FM signal causes the starting phases of the resultant output signal at terminal 62 to vary from pulse to pulse within a given modulation cycle. More specifically, there is a geometric progression in phase between adjacent pulses of the composite signal within a modulation cycle. The total relative phase shift with respect to a chosen reference phase will tend to increase during each modulation period. A modulation code generator which is not adjustable as to the code, but which operates as the presently described modulation code generator 60, is disclosed in the above referenced U.S. Pat. No. 3,883,871. A complete description of the operation of the modulation code generator, along with wave forms, is disclosed in the above referenced patent. Further, reference numerals similar to those utilized in the above referenced patent have been used in the present disclosure to designate similiar components so that a more complete understanding of the construction and operation of the present invention is possible.

Figure 5:
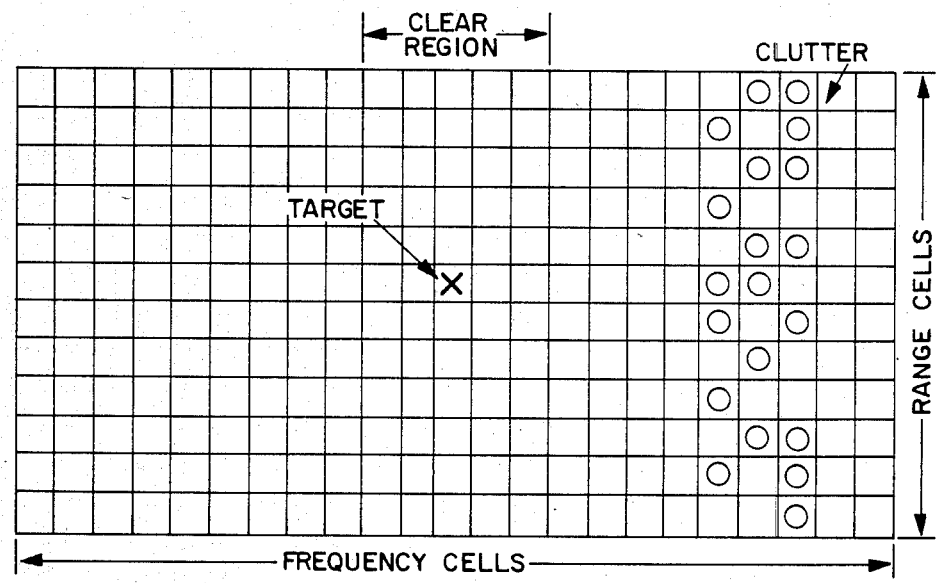
FIG. 5 is a chart illustrating typical range cells versus frequency cells response with an acceptable separation between the target and clutter frequency spectrum.
Figure 3:
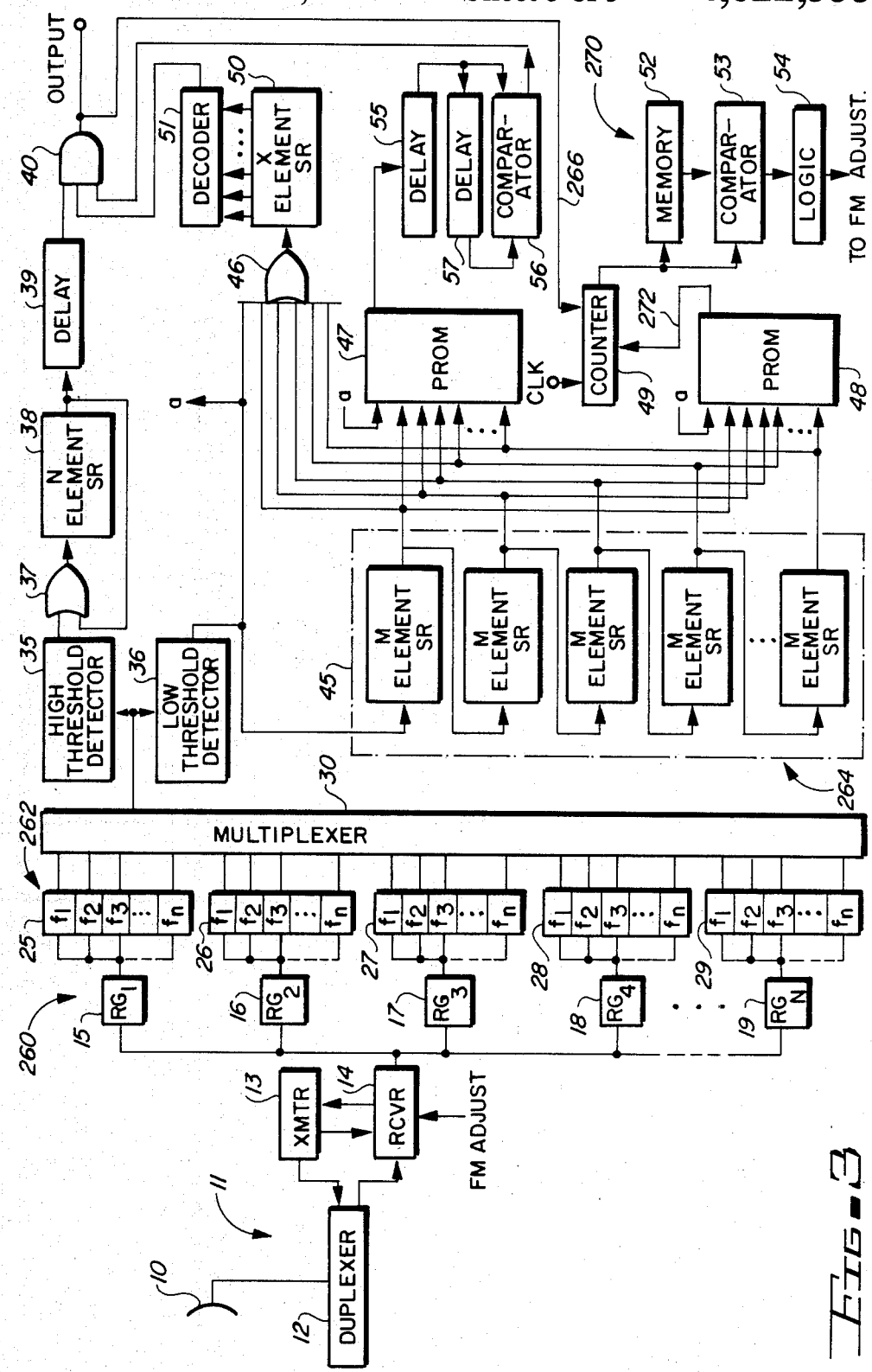
FIG. 3 is a block diagram of the radar system of FIG. 1 illustrating the clutter discriminating circuitry in more detail.

Referring specifically to FIG. 3 the number 10 indicates an antenna for a pulsed Doppler radar front end generally designated 11, the antenna 10 is connected to duplexer 12 which electrically connects the antenna 10 either to the output of a transmitter 13 or the input of a receiver 14. The antenna 10, duplexer 12, transmitter 13 and receiver 14 are essentially a block diagram of the microwave system 211 illustrated in FIG. 1 or a similar microwave system that provides the necessary functions. The output of the receiver 14 is connected to a plurality of range gates 1–N, which are designated 15–19. As is well known in the art, the range gates represent adjacent steps or sections of continous range and any desired number, N, of range gates may be utilized, depending upon the frequency of the radar, pulse repetition rate, speed of the targets to be discerned etc. The output of each of the range gates 15–19 is then applied to a bank of filters, there being N-banks of filters numbered 25–29. Each of the banks of filters 25–29 has M-filters therein with an output from each of the filters in each of the banks 25–29 connected to a multiplexer 30. Thus the output of the radar 11 is divided into a plurality of range gates and each range gate is divided into a plurality of frequencies which are serially read out of the multiplexer 30. FIG. 5 illustrates a chart made up of 12 range cells, or gates, with each range cell or gate including 23 frequency cells. Thus, in the specific radar represented by the chart of FIG. 5 there are 12 range gates connected to the receiver and each range gate has 23 parallel Doppler filters connected to the output thereof.

The output of the multiplexer 30 is applied to a high threshold detector 35 and to a low threshold detector 36. The output of the high threshold detector 35 is connected to one input of an OR gate 37, the output of which is connected to the input of an N element shift register 38. The output of the shift register 38 is connected to a second input of the OR gate 37 and through a delay network 39 to one input of an AND gate 40. The output of the low threshold detector is connected to an input of a serpentine delay line, serial to parallel converter, generally designated 45. Each of the shift registers is an M-element register and there should be one less shift registers than there are range gates with the number of elements in each shift register being equal to the number of filters in each of the filter banks 25-29. Thus, when all of the signals from all of the filter banks (except filter bank 29) are clocked into the shift registers in the converter 45 the signals from the last filter bank 29 pass directly through converter 45 and the signals from each of the range gates are supplied at the output of converter 45 in parallel, i.e., the first frequency from each of range gates 15-19 appears at the outputs of converter 45 in parallel and then the second from each of the range gates appears, etc.

The N parallel signals from converter 45 are applied to N inputs of an OR gate 46 and to N inputs of a programmable read-only-memory 47. The output of OR gate 46 is applied to an X element shift register 50 which has parallel outputs connected to parallel inputs of a decoder 51. The shift register 50 and decoder 51 form a comparator which is precoded to accept only predetermined patterns. The output of decoder 51 is connected to a second input of AND gate 40. The output of programmable read-only-memory 47 is connected to a delay 55 which is placed in the circuit to allow the data in the line to coincide, in time, with the data in the other lines. The output of delay 55 is connected to one input of a comparator 56 and is also connected through a one-bit delay 57 to a second input of comparator 56. The output of comparator 56 is connected to a third input of AND gate 40. All of the range gates 260, parallel Doppler filters 262, and clutter logic 264 described to this point are completely disclosed in the above referenced U.S. Pat. No. 4,119,966 along with a more complete description of the operation thereof. The logic circuitry disclosed up through AND gate 40 is utilized to discriminate desired targets from clutter. Thus, the output from AND gate 40 is the frequency spectrum of energy returned from a desired target.

In a similar fashion, converter 45 applies parallel signals to a second PROM 48 which is programmed opposite to PROM 47. That is, PROM 48 is programmed to recognize clutter rather than targets. Generally, clutter will appear in a large number of range cells or gates, simultaneously, as illustrated in FIG. 5 by the zeros. Thus, whenever 3 or more range cells contain a return the PROM 48 will indicate that the return is clutter. It will of course be understood that the clutter logic described above is simply one system for discriminating targets from clutter and that a variety of other systems might be utilized. Also, many modifications and improvements might be devised by those skilled in the art as alterations to the system disclosed. While separate PROMs 47 and 48 are utilized to separate the target frequency spectrum from a frequency spectrum returned by clutter, it will be understood that in many instances a single PROM might be utilized, since anything which is not a target is generally defined as clutter. However, the two PROMs 47 and 48 are disclosed herein for ease of understanding the invention and to completely separate the clutter frequency spectrum.

The frequency spectrum produced by a target, available at the output of AND gate 40 is supplied to one input of a counter 49. The frequency spectrum produced by clutter, available at the output of PROM 48 is supplied to a second input of the counter 49. Counter 49 also receives a clock input which is the same clock that operates the converter 45 (not shown, but understood by those skilled in the art). Each time converter 45 shifts frequency cells, e.g. from the first frequency in each of the range gates to the second frequency in each of the range gates, the counter is clocked one count. The counter 49 is enabled by the first of either of the inputs from AND gate 40 or PROM 48. Further, counter 49 is stopped and read out by the second signal to be applied thereto by either AND gate 40 or PROM 48. Thus, counter 49 counts the number of frequency cells between the frequency spectrum of energy returned from a desired target and the frequency spectrum of energy returned from clutter. Referring to FIG. 5, a target appears in the twelfth range cell, from the left of the chart, and the clutter first appears in the nineteenth frequency cell. Thus, if counter 49 is enabled by the target and stopped by the clutter the counter will count six frequency cells between the target and the clutter. It will of course be understood by those skilled in the art that the counter 49 is simply one type of apparatus utilized to determine the frequency separation between the target and clutter and many embodiments and structures could be devised by those skilled in the art. A typical example of another structure that could be utilized might be a comparator with the target and the clutter output from AND gate 40 and PROM 48 supplied to a memory and later compared.

Once the counter 49 has been stopped and a count ascertained, that count is supplied to a memory 52. The next count is supplied to a comparator 53 where is it compared to the count stored in memory 52 to determine whether the target and clutter frequency spectrum are closing, separating, or the separation is remaining constant. While the counter 49, memory 52 and comparator 53 are illustrated in simplified block form it will be understood that buffers and the like might be utilized to insure that each count is supplied to the comparator 53 and compared to the previous count stored in memory 52 before the new count is supplied to the memory 52.

The output of the comparator 53 is supplied to logic circuitry 54 which makes a determination as to whether the code or FM modulation, requires adjustment. In general, the logic circuitry 54 will not adjust the code until the clutter comes within some minimum frequency separation of the target. A typical frequency separation might be one or more frequency cells. Generally several cells might be chosen as the minimum separation so that when the frequency spectrums of the target and clutter start to close there will be time to alter the code before the target return is obliterated. The logic circuitry 54, in its simplest form, can be a connection from the comparator 53 such that when the comparison indicates less than a predetermined frequency separation a signal will be supplied to the modulation code generator to alter the code and the signal will continue to alter the code until the separation excedes the predetermined minimum.

FIG. 4 represents the output signal from modulation code generator 60 which is supplied to the single side band up converter 214 (see FIG. 1). More specifically, FIG. 4 shows the frequency, measured with respect to axis 202, as a function of time, measured with respect to time axis 204 of the output signal. The time of a complete modulation cycle of a first code is indicated by the interval between times $T_1$ and $T_2$ along axis 204. The interval of time between $T_1$ and $T_2$ corresponds to the time between successive reset pulses produced by multivibrator 120 as described above. Adjusting divider 109 to a different divide number changes the time between the reset pulses produced by multivibrator 120 and, therefore, changes the code. As an example, when the divider 109 is altered so that the time between reset pulses from the multivibrator 120 corresponds with the interval $T_1$ to $T_3$ the output signal from the modulation code generator will contain two less bursts of RF energy. In a second example illustrated in FIG. 4 the divider 109 is altered so that the time between reset pulses corresponds with time $T_1$ through $T_4$. In this instance the output contains four additional bursts of RF energy. It will of course be understood that the divider 109 can be constructed with predetermined steps so that any desired number of bursts can be added or subtracted with each step thereof. Also, if the code is adjusted in accordance with a method other than by divider 109 the adjustment can be a continuous change. In general, the number of bursts of RF energy, with the PRF constant, during a single cycle of the PRF is referred to as the code. The number of bursts in a cycle of the PRF also determines the slope of the sawtooth which may be another indication of the code. Generally, altering the code, or changing the duration of the sawtooth, changes the starting phases of the pulses or bursts of RF energy. The alteration of the phases generally has a different effect on the fixed frequency of clutter than it does on a target, thereby causing the frequency spectrums to move with respect to each other. It is difficult to predict the effect that a change in the code will have on the separation between target and clutter, and, hence, adjustment of the code to move the clutter frequency spectrum away from the target frequency spectrum may take a variety of embodiments. For example, the system might alter from $T_1$-$T_2$ to $T_1$-$T_3$ and evaluate the results. If the clutter and target frequency spectrums are moved closed together rather than being separated farther, the system might alter the code to a $T_1$-$T_4$ mode. The results would again be evaluated, etc. Alternately the adjustable divider or controllable oscillator might simply be swept through its range until a desired separation of frequencies is attained. Alternately, the desired next code might be calculated in a microprocessor incorporated by logic 54.

Accordingly, improved clutter-adaptive modulation apparatus and methods for use with a coded pulse Doppler radar have been disclosed. This apparatus and method greatly reduces the effects of clutter in a coded pulse Doppler radar without substantially increasing the complexity or amount of apparatus required. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In conjunction with a pulse Doppler radar having a transmitter and receiver and wherein the phase/frequency of the transmitter is changed from pulse to pulse in accordance with a predetermined code, a method of clutter-adaptive modulation comprising the steps of:
   monitoring the frequency spectrum of energy returned from a desired target and the frequency spectrum of energy returned from clutter;
   providing a plurality of different codes, with the phase/frequency of the transmitter being changed from pulse to pulse at a different rate for each different code; and
   selecting in response to the monitoring, a code from the pluralities provided such that the frequency spectrum of energy returned from a desired target is separated from the frequency spectrum of energy returned from clutter.

2. In conjunction with a pulse Doppler radar having a transmitter and receiver and wherein the phase/frequency of the transmitter is changed from pulse to pulse in accordance with a predetermined code, a method of clutter-adaptive modulation comprising the steps of:
   providing a plurality of different codes with the phase/frequency of the transmitter being changed from pulse to pulse at a different rate for each different code;
   determining the frequency spectrum of energy returned from a desired target, the frequency spectrum of energy returned from clutter, the frequency separation therebetween;
   providing a predetermined minimum frequency separation; and
   selecting a different one of the pluralities of different codes when the frequency separation is less than the predetermined minimum.

3. Clutter-adaptive modulation apparatus comprising:
   a pulse Doppler radar having a transmitter and receiver and wherein the phase/frequency of the transmitter is changed from pulse to pulse in accordance with a predetermined code, said radar including adjustable means therein for altering the rate of change of the phase/frequency from pulse to pulse to provide a plurality of different codes and a video output;
   means connected to receive the video output from said radar for determining the frequency spectrum of energy returned from a desired target and the frequency spectrum of energy returned from clutter;
   means connected to said determining means for providing an indication of the amount of the seperation of the frequency spectrums; and
   means connected to receive the indication of the amount of the separation of the frequency spectrums and further connected to said adjustable means for selecting different codes in said radar to maintain the separation of the frequency spectrums at least at a predetermined minimum amount.

4. Apparatus as claimed in claim 3 wherein the adjustable means includes at least one of an adjustable oscillator and an adjustable divider.

5. Apparatus as claimed in claim 4 wherein the adjustable means includes a modulation code generator.

6. Apparatus as claimed in claim 3 wherein the frequency spectrum determining means includes at least one read-only-memory programmed to recognize the frequency spectrum of energy returned from a desired target.

* * * * *